(12) United States Patent
Bhatnagar et al.

(10) Patent No.: US 11,800,442 B1
(45) Date of Patent: Oct. 24, 2023

(54) POWER MANAGEMENT BASED ON HANDOVER STATUS

(71) Applicant: META PLATFORMS TECHNOLOGIES, LLC, Menlo Park, CA (US)

(72) Inventors: Abhishek Bhatnagar, South San Diego, CA (US); Gahima Stephen Mbonye, Emeryville, CA (US); Pratima Vallurupalli, Leander, TX (US); Shivank Nayak, Milpitas, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/826,495

(22) Filed: May 27, 2022

(51) Int. Cl.
*H04W 52/02* (2009.01)
*H04W 36/00* (2009.01)
*H04W 84/12* (2009.01)

(52) U.S. Cl.
CPC .. *H04W 52/0203* (2013.01); *H04W 36/00837* (2018.08); *H04W 84/12* (2013.01)

(58) Field of Classification Search
CPC ....... H04W 52/0203; H04W 36/00837; H04W 84/12; H04W 52/0209; H04W 88/06; H04W 36/14; H04W 36/144; H04W 36/1446; H04W 36/36
See application file for complete search history.

(56) References Cited

U.S. PATENT DOCUMENTS

| | | | | |
|---|---|---|---|---|
| 8,750,263 | B2 * | 6/2014 | Kezys | H04L 12/66 709/227 |
| 9,232,408 | B2 * | 1/2016 | Richards | H04W 24/10 |
| 10,448,288 | B2 * | 10/2019 | Kim | H04W 36/14 |
| 10,602,483 | B2 * | 3/2020 | Singh | H04W 68/12 |
| 2013/0267224 | A1 * | 10/2013 | Krishnaswamy | H04W 36/14 455/426.1 |
| 2023/0010265 | A1 * | 1/2023 | Vangaru | H04W 76/10 |

\* cited by examiner

*Primary Examiner* — Ahmed Elallam
(74) *Attorney, Agent, or Firm* — Foley & Lardner LLP

(57) ABSTRACT

A device may include a controller and a modem of a first wireless network. The controller may determine that the modem is in active mode and the device is using a second wireless network for communication instead of the first wireless network. In response to the determining, the controller may switch the modem into power-save mode. In response to a handover triggering event, the controller may switch the modem to the active mode and acquire a service of the first wireless network without registering with the first wireless network. The controller may determine that a communication service is to be handed over to the service of the first wireless network. In response to determining that the communication service is to be handed over, the controller may perform registration with the first wireless network, and perform handover of the communication service to the service of the first wireless network.

20 Claims, 7 Drawing Sheets

POWER MANAGEMENT BASED ON HANDOVER STATUS

FIELD OF DISCLOSURE

The present disclosure is generally related to wireless communication, including but not limited to performing a power management process based on a handover status of a service between two wireless networks.

BACKGROUND

A device can use a service over multiple wireless networks. For example, a wireless device (e.g., mobile phones, console, head wearable display, etc.) may use IP multimedia subsystem (IMS) services over a cellular network (e.g., 3G, 4G Long Term Evolution (LTE), 5G) or wireless local area network (WLAN; e.g., WLAN based on the IEEE 802.11 standards).

When a device uses a service over multiple networks, the device may consume unnecessary power, thereby reducing the battery life of the device and impacting the user experience.

SUMMARY

Various embodiments disclosed herein are related to a device including a controller and a modem of a first wireless network. In some embodiments, the controller may be configured to determine that the modem is in active mode and the device is using a second wireless network for communication instead of the first wireless network. In response to the determining, the controller may be configured to switch the modem into power-save mode. The controller may be configured to detect a handover triggering event. In response to the handover triggering event, the controller may be configured to switch the modem to the active mode and acquire a service of the first wireless network without registering with the first wireless network. The controller may be configured to determine that a communication service is to be handed over to the service of the first wireless network. In response to determining that the communication service is to be handed over, the controller may be configured to perform registration with the first wireless network, and perform handover of the communication service to the service of the first wireless network.

In some embodiments, the device may include a timer. In response to determining that that the modem is in active mode and the device is using a second wireless network for communication instead of the first wireless network, the controller may be configured to start the timer which is set to a predetermined time. After the predetermined time elapses, the controller may be configured to switch the modem into the power-save mode. In some embodiments, the modem may be a cellular modem. The first wireless network may be a cellular network. The second wireless network may be a wireless local area network (WLAN). In some embodiments, the communication service is an internet protocol (IP) multimedia subsystem (IMS) service.

In some embodiments, the handover triggering event is a start of one or more communication services. The one or more communication services may include at least one of a mobile originating (MO) voice service, a MO video service, a MO short message service (SMS), a mobile terminating (MT) voice service, a MT video service, or a MT SMS. The controller may be configured to determine that the one or more communication services have ended. In response to determining that the one or more communication services have ended, the controller may be configured to switch the modem into the power-save mode.

In some embodiments, the handover triggering event may be/include a degradation of a quality of signals of the second wireless network. In response to determining that a signal strength of a signal in the second wireless network is greater than or equal to a first threshold for using the second wireless network, the controller may be configured to switch the modem of the first wireless network to the power-save mode.

In some embodiments, in determining that the communication service is to be handed over to the service of the first wireless network, the controller may be configured to determine that the communication service has not ended and that a signal strength of a signal in the second wireless network is smaller than a second threshold for using the second wireless network.

Various embodiments disclosed herein are related to a method for managing power in a device. In some embodiments, the method may include determining, by a controller of a device, that a modem of a first wireless network is in active mode and the device is using a second wireless network for communication instead of the first wireless network. The method may include in response to the determining, switching the modem into power-save mode. The method may include detecting, by the controller, a handover triggering event. The method may include, in response to the handover triggering event, switching, by the controller, the modem to the active mode and acquiring a service of the first wireless network without registering with the first wireless network. The method may include determining, by the controller, that a communication service is to be handed over to the service of the first wireless network. The method may include in response to determining that the communication service is to be handed over, performing, by the controller, registration with the first wireless network, and handover of the communication service to the service of the first wireless network.

In some embodiments, in response to determining that that the modem is in active mode and the device is using a second wireless network for communication instead of the first wireless network, the controller may start a timer which is set to a predetermined time. After the predetermined time elapses, the controller may switch the modem into the power-save mode. In some embodiments, the modem may be a cellular modem. The first wireless network may be a cellular network, and the second wireless network may be a wireless local area network (WLAN). In some embodiments, the communication service may be an internet protocol (IP) multimedia subsystem (IMS) service.

In some embodiments, the handover triggering event may be a start of one or more communication services. The one or more communication services may include at least one of a MO voice service, a MO video service, a MO short message service (SMS), a MT voice service, a MT video service, or a MT SMS. The controller may determine that the one or more communication services have ended. In response to determining that the one or more communication services have ended, the controller may switch the modem into the power-save mode.

In some embodiments, the handover triggering event may be/include a degradation of a quality of signals of the second wireless network. In response to determining that a signal strength of a signal in the second wireless network is greater than or equal to a first threshold for using the second wireless network, the controller may switch the modem of the first wireless network to the power-save mode.

In some embodiments, in determining that the communication service is to be handed over to the service of the first wireless network, the controller may determine that the communication service has not ended and that a signal strength of a signal in the second wireless network is smaller than a second threshold for using the second wireless network.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
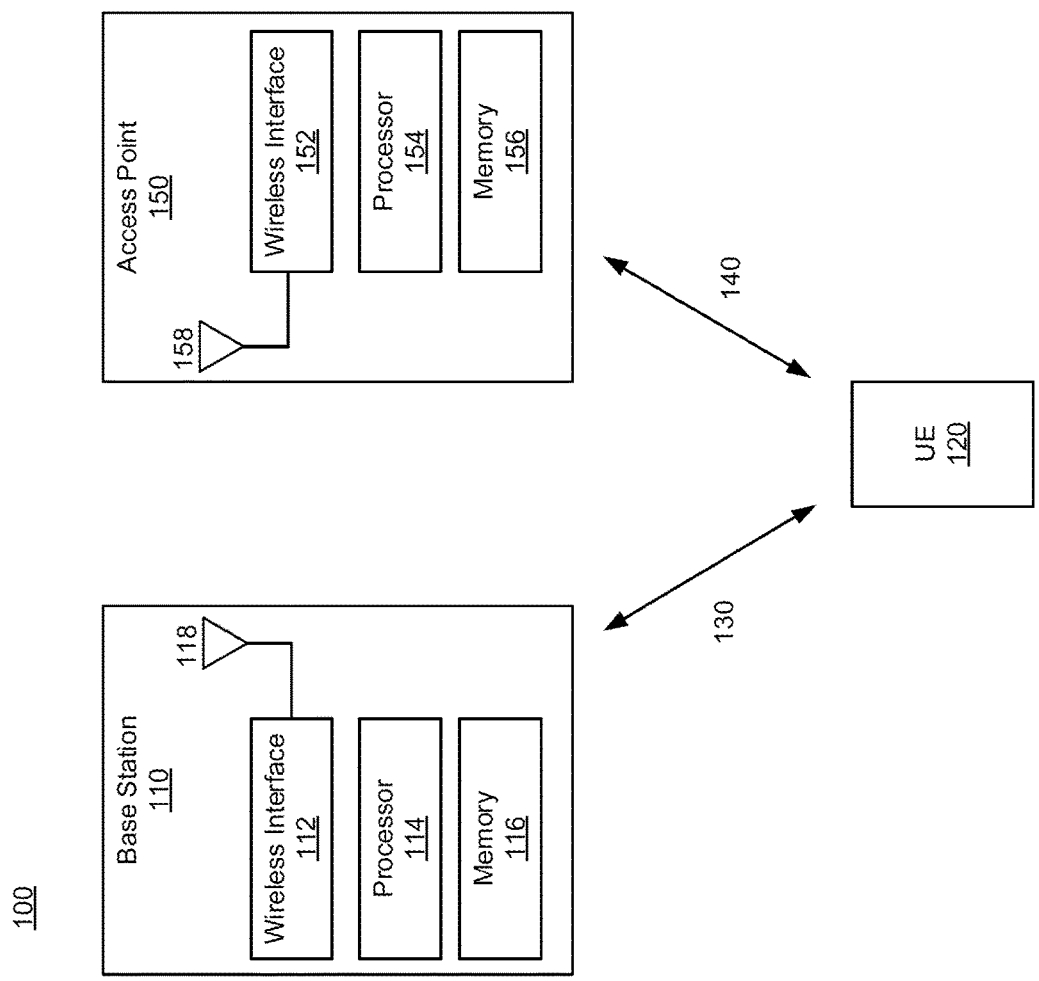
FIG. 1 is a diagram of an example wireless communication system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are systems and methods related to performing power management in a device based on a handover status of a service between two wireless networks. This present disclosure relates to systems and methods of achieving power savings in supporting IP Multimedia Subsystem (IMS) services via cellular networks and Wi-Fi networks (WLANs), when a cellular modem of a device is turned on and the device is using a WLAN for IMS services, by (1) putting/placing/transitioning, after a predetermined time elapses, the cellular modem into a power-save mode, (2) upon start of an IMS service or degradation of Wi-Fi signals, switching on the cellular modem and acquiring a cellular service, and/or (3) holding the cellular modem in pre-registration until an IMS service is handed over to the cellular service.

When a wireless device or user equipment (UE) is using WLAN (or Wi-Fi) for both IMS services and the internet, a cellular modem may remain active. This may consume unnecessary power, thereby reducing battery life. Moreover, there is a need to ensure proper and efficient handover of an IMS service (e.g., voice call) from WLAN to a cellular network without impacting user experience.

To solve this problem, according to certain aspects, embodiments in the present disclosure relate to techniques for performing a power saving (e.g., power reduction) operation when a communication service (e.g., IMS services) are using WLAN. In some embodiments, when all communication services in a wireless device (e.g., a cellular/smart phone, a console, or a head wearable display, etc.) are using WLAN, the wireless device may perform a power saving operation by keeping (or putting or switching) a cellular modem in a minimal receive mode or a power-save mode. In some embodiments, the wireless device may hold (or keep or maintain) the cellular modem in a pre-registration state and in a low power (e.g., power reduction, inactive, sleep) mode as its WLAN interface can handle communications prior to a transition, switch or handover to the cellular network.

In one embodiments, a wireless device can achieve power savings in supporting IP Multimedia Subsystem (IMS) services via cellular and Wi-Fi networks, when a cellular modem of a device is turned on and the device is using a Wi-Fi network for IMS services, by (1) putting, after a predetermined time elapses, the cellular modem into a power-save mode, (2) upon start of an IMS service or degradation of Wi-Fi signals, switching on the cellular modem and acquiring a cellular service, and/or (3) holding the cellular modem in pre-registration mode/state until an IMS service is handed over to the cellular service.

In one approach, a device may include a cellular modem, a controller and a timer. The controller may determine that the cellular modem is turned on and IMS packet-data network (PDN) has been handed over to a Wi-Fi network (WLAN), and can start the timer which is set to a predetermined time. The predetermined time may be a time to ensure that Wi-Fi signal quality be good enough, for example, 10-15 seconds. After the predetermined time elapses, the controller may put/enter/transition the cellular model into a power-save mode. The controller may detect a handover triggering event and can then switch on the cellular modem, and may acquire a cellular service without registering with a cellular network. The controller may determine that an IMS service is to be handed over to the cellular service, may perform registration with the cellular network, and can perform handover of the IMS service from the Wi-Fi network to the cellular service.

In one approach, the handover triggering event may be/include start of one or more IMS services. For example, the IMS services include mobile originating (MO) calls, mobile terminating (MT) voice, MT video, or MT short message service (SMS). The controller may determine that an IMS service ends and can then put the cellular modem in the power-save mode.

In one approach, the handover triggering event may be/include degradation of a quality of Wi-Fi signals. For example, the controller may monitor a signal strength of Wi-Fi signals and can determine that signal strength of a Wi-Fi signal is lower than a threshold. The controller may determine that a signal quality of Wi-Fi signals has improved and can then put/place the cellular modem in the power-save mode.

In one approach, a device may determine that IMS PDN has been moved to WLAN and there is no active IMS service (e.g., call, SMS), and can then move a cellular stack (or a cellular modem) of the device to a power-save state. If the device determines that (1) an MO voice/video/SMS or an MT voice/video/SMS starts or that (2) a Wi-Fi signal is degrading (e.g., degraded by a certain level/threshold), then the device may switch on the cellular modem and acquire service on one or more suitable cells (or cell sites or base stations) but do not register with the cellular network, thereby saving time and keeping the device ready for handover. Suitable cells or base stations may be those that can provide full service, e.g., belonging to a preferred network that is not forbidden and allows IMS services and data connectivity. Once the device determines that an IMS call on WLAN is to be handed over to a cellular service (e.g., when Wi-Fi signal quality is lower than a threshold) then the device can perform cellular network registration first, and then can handover the IMS call to the cellular service. In response to determining that (1) the IMS call ends and that (2) the Wi-Fi signal quality has improved, the device can put the cellular stack (or cellular modem) in a power-save mode.

In one approach, a wireless device may determine that (1) a cellular modem of the device is active and that (2) IMS PDN and/or internet have been handed over from a cellular network to WLAN. In response to determining the conditions (1) and (2), the device may start a timer that is set to time T. Time T may be a time to ensure that Wi-Fi signal quality should be sufficient to handle a service (e.g., IMS service). An example value of time T is in a range from 10 seconds to 15 seconds. If Wi-Fi signal quality is not sufficient to handle the service (e.g., the signal quality is lower than a threshold), the IMS PDN and/or internet may be handed over back to the cellular network within time T. After the timer expires, e.g., time T has elapsed, the device may put (or switch or keep) a cellular modem of the device in a power-save mode. In some embodiments, after time T has elapsed, the device may disable/inactivate the cellular modem. The device may determine or detect that a MO/MT call has started on WLAN. In response to for instance determining that the MO/MT call has started on WLAN, the device may activate/initialize the modem and can acquire a suitable cell (or target cell site or target base station) without registration. In response to determining that the MO/MT call has not started on WLAN, the device may maintain the cellular modem in a power-save mode. The device may determine whether IMS PDN or internet is to be handed over to the cellular network. In some embodiments, the device may determine whether the MO/MT call has ended, and in response to determining that the call has not ended, may determine that the IMS PDN or internet is to be handed over to the cellular network. In response to determining that the IMS PDN or internet is to be handed over to the cellular network, the device may start registration and can perform handover of the IMS PDN or internet to the cellular network. In some embodiments, the device may perform registration by (1) communicating with the cellular network the identity of a subscriber to ensure that the subscriber account is valid, and (2) registering the device with HLR and/or VLR of the cellular network so that the cellular network can keep track of the location/position of the device. The device may determine that the IMS MO/MT call has ended. In response to determining that the MO/MT call has ended, the device may put (or switch or keep) a cellular modem of the device in a power-save mode or disable the modem.

In one approach, a wireless device may determine that (1) a cellular modem of the device is active and that (2) IMS PDN and/or internet have been handed over from a cellular network to WLAN. In response to the determining the conditions (1) and (2), the device may start a timer that is set to time T. Time T may be a time to ensure that Wi-Fi signal quality should be sufficient to handle a service (e.g., IMS service). An example value of time T is in a range from seconds to 15 seconds. If Wi-Fi signal quality is not sufficient to handle the service (e.g., the signal quality is lower than a threshold), the IMS PDN and/or internet may be handed over back to the cellular network within time T. After the timer expires, e.g., time T has elapsed, the device may put (or switch or keep) a cellular modem of the device in a power-save mode. In some embodiments, after time T has elapsed, the device may disable the cellular modem. The device may determine or detect that Wi-Fi signal quality is lower than a first threshold. In response to determining that the Wi-Fi signal quality is lower than the first threshold, the device may activate the modem and acquire a suitable cell (or target cell site or target base station) without registration. For example, the device may use a paging or control channel to send an attach message to the target base station on the cellular network, thereby indicating the presence of the device. In response to determining that the Wi-Fi signal quality is greater than or equal to the first threshold, the device may maintain the cellular modem in a power-save mode. The device may determine whether IMS PDN or internet is to be handed over to the cellular network. In some embodiments, the device may determine whether Wi-Fi signal quality is greater than or equal to a second threshold, and in response to determining that the Wi-Fi signal quality is lower than the second threshold, may determine that the IMS PDN or internet is to be handed over to the cellular network. In some embodiments, the second threshold may be lower than the first threshold. In response to determining that the IMS PDN or internet is to be handed over to the cellular network, the device may start registration and perform handover of the IMS PDN or internet to the cellular network. In some embodiments, the device may perform registration by (1) communicating with the cellular network the identity of a subscriber to ensure that the subscriber account is valid, and (2) registering the device with HLR and/or VLR of the cellular network so that the cellular network can keep track of the location/position of the device. The device may determine that Wi-Fi signal quality is greater than or equal to the second threshold. In response to determining that the Wi-Fi signal quality is greater than or equal to the second threshold, the device may put (or switch or keep) a cellular modem of the device in a power-save mode or disable the modem.

In one approach, a device may include a controller and a modem of a first (e.g., cellular) wireless network. The controller may determine that the modem is in active mode and the device is using a second (e.g., WLAN) wireless network for communication instead of the first wireless network. In response to the determining, the controller may switch the modem into power-save mode. In response to a handover triggering event, the controller may switch the modem to the active mode and can acquire a service of the first wireless network without registering with the first wireless network. The controller may determine that a communication service is to be handed over to the service of the first wireless network. In response to determining that the communication service is to be handed over, the controller may perform registration with the first wireless network, and can perform handover of the communication service to the service of the first wireless network.

In one approach, the device may further include a timer. In response to determining that that the modem is in active mode and the device is using a second wireless network for communication instead of the first wireless network, the controller may be configured to start the timer which is set to a predetermined time. After the predetermined time elapses, the controller may be configured to switch the modem into the power-save mode.

In one approach, the modem may be a cellular modem. The first wireless network may be a cellular network. The second wireless network may be a wireless local area network (WLAN). In one approach, the communication service is an internet protocol (IP) multimedia subsystem (IMS) service.

In one approach, the handover triggering event is a start of one or more communication services. The one or more communication services may include at least one of a mobile originating (MO) voice service, a MO video service, a MO short message service (SMS), a mobile terminating (MT) voice service, a MT video service, or a MT SMS. The controller may be configured to determine that the one or more communication services have ended. In response to determining that the one or more communication services have ended, the controller may be configured to switch the modem into the power-save mode.

In one approach, the handover triggering event may be/include a degradation of a quality of signals of the second wireless network. In response to determining that a signal strength of a signal in the second wireless network is greater than or equal to a first threshold for using the second wireless network, the controller may be configured to switch the modem of the first wireless network to the power-save mode.

In one approach, in determining that the communication service is to be handed over to the service of the first (e.g., cellular) wireless network, the controller may be configured to determine that the communication service has not ended and that a signal strength of a signal in the second (e.g., WLAN or Wifi) wireless network is smaller than a second threshold for using the second wireless network.

Embodiments in the present disclosure have at least the following advantages and benefits. First, embodiments in the present disclosure can provide useful techniques for reducing unnecessary power to provide better battery life when all activities in a wireless device are happening over WLAN. When all activities in a wireless device are happening over WLAN, the wireless device can keeping its cellular modem in a power-save mode, or keeping the modem from being used, such that the Wi-Fi interface of the device can handle IMS services in a power-save mode prior to handover to a cellular service. Second, embodiments in the present disclosure can provide useful techniques for achieving proper handover of an IMS service from Wi-Fi to the cellular service without impacting user experiences. For example, the Wi-Fi interface of the device can handle IMS services in a pre-registration state (e.g., performing all operation to have cellular access except for registration), the handover can be efficiently performed when the registration is performed.

FIG. 1 illustrates an example wireless communication system 100. The wireless communication system 100 may include a base station 110 (also referred to as "a wireless communication node 110" or "a station 110"), an access point 150, and/or one or more user equipment (UEs) 120 (also referred to as "wireless communication devices 120" or "terminal devices 120"). The base station 110 and the UEs 120 may communicate through one or more wireless communication links 130. The access point 150 and the UEs 120 may communicate through one or more wireless communication links 140. A UE 120 may have configuration similar to that of UE 200 in FIG. 2. In some embodiments, the wireless communication system 100 includes more, fewer, or different components than shown in FIG. 1. For example, the wireless communication system 100 may include one or more additional base stations 110 or one or more additional access points 150 than shown in FIG. 1.

In some embodiments, the base station 110 may be an evolved node B (eNB), a serving eNB, a target eNB, a femto station, or a pico station. The base station 110 may be communicatively coupled to another base station 110 or other communication devices through a wireless communication link and/or a wired communication link. The base station 110 may receive data (or a RF signal) in an uplink communication from a UE 120. Additionally or alternatively, the base station 110 may provide data to another UE 120, another base station, or another communication device. Hence, the base station 110 allows communication among UEs 120 associated with the base station 110, or other UEs associated with different base stations. In some embodiments, the base station 110 includes a wireless interface 112, a processor 114, a memory device 116, and one or more antennas 118. These components may be embodied as hardware, software, firmware, or a combination thereof. In some embodiments, the base station 110 includes more, fewer, or different components than shown in FIG. 1. For example, the base station 110 may include an electronic display and/or an input device. For example, the base station 110 may include additional antennas 118 and wireless interfaces 112 than shown in FIG. 1.

The antenna 118 may be a component that receives a radio frequency (RF) signal and/or transmits a RF signal through a wireless medium. The antenna 118 may be a dipole antenna, a patch antenna, a ring antenna, or any suitable antenna for wireless communication. In one aspect, a single antenna 118 is utilized for both transmitting the RF signal and receiving the RF signal. In one aspect, different antennas 118 are utilized for transmitting the RF signal and receiving the RF signal. In one aspect, multiple antennas 118 are utilized to support multiple-in, multiple-out (MIMO) communication.

The wireless interface 112 includes or is embodied as a transceiver for transmitting and receiving RF signals through one or more antennas 118. The wireless interface 112 may communicate with a wireless interface of the UE 120 (e.g., cellular modem or wireless modem) through a wireless communication link 130. In one configuration, the wireless interface 112 is coupled to one or more antennas 118. In one aspect, the wireless interface 112 may receive the RF signal at the RF frequency received through antenna 118, and downconvert the RF signal to a baseband frequency (e.g., 0-1 GHz). The wireless interface 112 may provide the downconverted signal to the processor 124. In one aspect, the wireless interface 122 may receive a baseband signal for transmission at a baseband frequency from the processor 114, and upconvert the baseband signal to generate a RF signal. The wireless interface 112 may transmit the RF signal through the antenna 118.

The processor 114 is a component that processes data. The processor 114 may be embodied as FPGA, ASIC, a logic circuit, etc. The processor 114 may obtain instructions from the memory device 116, and executes the instructions. In one aspect, the processor 114 may receive downconverted data at the baseband frequency from the wireless interface 112, and decode or process the downconverted data. For example, the processor 114 may generate audio data or image data according to the downconverted data. In one aspect, the processor 114 may generate or obtain data for transmission at the baseband frequency, and encode or process the data. For example, the processor 114 may encode or process image data or audio data at the baseband frequency, and provide the encoded or processed data to the wireless interface 112 for transmission. In one aspect, the processor 114 may set, assign, schedule, or allocate communication resources for different UEs 120. For example, the processor 114 may set different modulation schemes, time slots, channels, frequency bands, etc. for UEs 120 to avoid interference. The processor 114 may generate data (or UL CGs) indicating configuration of communication resources, and provide the data (or UL CGs) to the wireless interface 112 for transmission to the UEs 120.

The memory device 116 is a component that stores data. The memory device 116 may be embodied as RAM, flash memory, ROM, EPROM, EEPROM, registers, a hard disk, a removable disk, a CD-ROM, or any device capable for storing data. The memory device 116 may be embodied as a non-transitory computer readable medium storing instructions executable by the processor 114 to perform various functions of the base station 110 disclosed herein. In some embodiments, the memory device 116 and the processor 114 are integrated as a single component.

The UE 120 may communicate with the base station 110 through a corresponding communication link 130. In some embodiments, the wireless communication link 130 may be a cellular communication link conforming to 3G, 4G, 5G or other cellular communication protocols. In one example, the wireless communication link 130 supports, employs or is based on an orthogonal frequency division multiple access (OFDMA). In one aspect, the UEs 120 are located within a geographical boundary with respect to the base station 110, and may communicate with or through the base station 110. The UE 120 may transmit data to the base station 110 through the wireless communication link 130, and receive data from the base station 110 through the wireless communication link 130. Example data may include audio data, image data, text, etc. Communication or transmission of data by the UE 120 to the base station 110 may be referred to as an uplink communication. Communication or reception of data by the UE 120 from the base station 110 may be referred to as a downlink communication.

In some embodiments, communication between the base station 110 and the UE 120 is based on one or more layers of Open Systems Interconnection (OSI) model. The OSI model may include layers including: a physical layer, a Medium Access Control (MAC) layer, a Radio Link Control (RLC) layer, a Packet Data Convergence Protocol (PDCP) layer, a Radio Resource Control (RRC) layer, a Non Access Stratum (NAS) layer or an Internet Protocol (IP) layer, and other layer.

In some embodiments, the access point 150 may be a router or any network device allowing one or more computing devices (e.g., UE 120) to access a network (e.g., the Internet). In some embodiments, the access point 150 includes a wireless interface 152, a processor 154, a memory device 156, and one or more antennas 158. These components may be embodied as hardware, software, firmware, or a combination thereof. In some embodiments, the access point 150 includes more, fewer, or different components than shown in FIG. 1. For example, the access point 150 may include an electronic display and/or an input device. For example, the access point 150 may include additional antennas 158 and wireless interfaces 152 than shown in FIG. 1.

The antenna 158 may be a component that receives a radio frequency (RF) signal and/or transmits a RF signal through a wireless medium. The antenna 158 may be a dipole antenna, a patch antenna, a ring antenna, or any suitable antenna for wireless communication. In one aspect, a single antenna 158 is utilized for both transmitting the RF signal and receiving the RF signal. In one aspect, different antennas 158 are utilized for transmitting the RF signal and receiving the RF signal. In one aspect, multiple antennas 158 are utilized to support multiple-in, multiple-out (MIMO) communication.

The wireless interface 152 includes or is embodied as a transceiver for transmitting and receiving RF signals through one or more antennas 158. The wireless interface 152 may be a chipset arranged to communicate over air interface with WLAN according to a protocol such as IEEE 802.11x. This chipset may then interface with the antenna 158 to facilitate communication with WLAN. For example, the wireless interface 152 may communicate with a wireless interface of the UE 120 (e.g., Wi-Fi interface) through a wireless communication link 140. In one configuration, the wireless interface 152 is coupled to one or more antennas 158. The wireless interface 152 may transmit the RF signal through the antenna 158.

The processor 154 is a component that processes data. The processor 154 may be embodied as FPGA, ASIC, a logic circuit, etc. The processor 154 may obtain instructions from the memory device 156, and executes the instructions. The memory device 156 is a component that stores data. The memory device 156 may be embodied as RAM, flash memory, ROM, EPROM, EEPROM, registers, a hard disk, a removable disk, a CD-ROM, or any device capable for storing data. The memory device 156 may be embodied as a non-transitory computer readable medium storing instructions executable by the processor 156 to perform various functions of the access point 150 disclosed herein. In some embodiments, the memory device 156 and the processor 154 are integrated as a single component.

The UE 120 may communicate with the access point 150 through the corresponding communication link 140. In some embodiments, the wireless communication link 140 may be a cellular communication link conforming to a protocol such as IEEE 802.11x. In one aspect, the UEs 120 are located within a geographical boundary with respect to the access point 150, and may communicate with or through the access point 150. The UE 120 may transmit data to the access point 150 through the wireless communication link 140, and receive data from the access point 150 through the wireless communication link 140. Example data may include audio data, image data, text, etc. Communication or transmission of data by the UE 120 to the access point 150 may be referred to as an uplink communication. Communication or reception of data by the UE 120 from the access point 150 may be referred to as a downlink communication.

Figure 2:
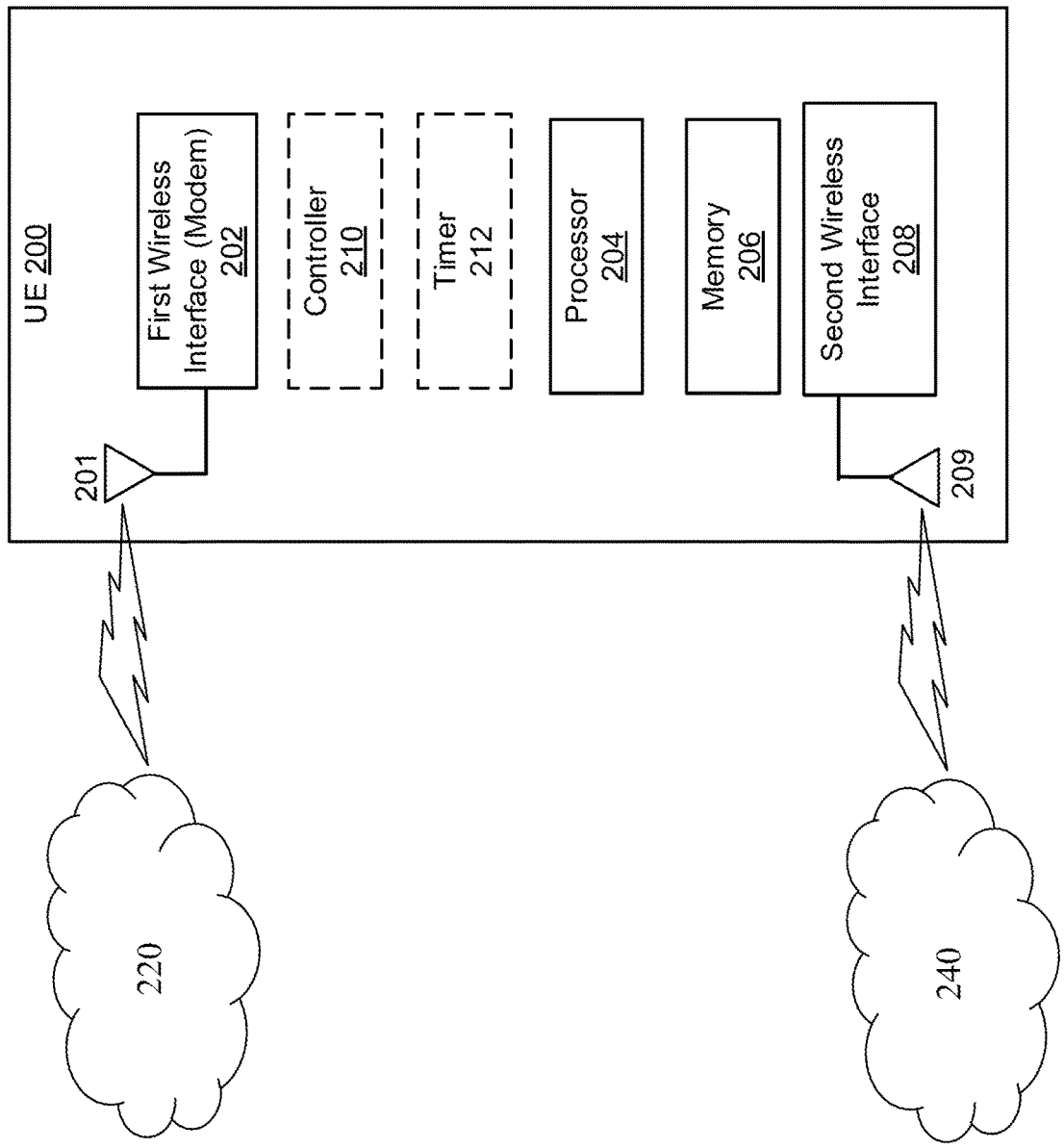
FIG. 2 is a diagram of an example wireless device (e.g., user equipment (UE)), according to an example implementation of the present disclosure.

FIG. 2 is a diagram of an example wireless device (e.g., user equipment (UE) 200), according to an example implementation of the present disclosure. In some embodiments, the UE 200 may be a user device such as a mobile phone, a smart phone, a personal digital assistant (PDA), tablet, laptop computer, wearable computing device, etc. In some embodiments, the UE 200 includes a first wireless interface 202, a second wireless interface 208, a controller 210, a timer 212, a processor 204, a memory device 206, and/or one or more antennas 201, 209. These components may be embodied as hardware, or a combination of hardware and software or firmware. In some embodiments, the UE 200 includes more, fewer, or different components than shown in FIG. 2. For example, the UE 200 may include an electronic display and/or an input device. For example, the UE 200 may include additional antennas and wireless interfaces than shown in FIG. 2.

The antenna 201 may be a component that receives a radio frequency (RF) signal and/or transmits a RF signal through a wireless medium. The RF signal may be at a frequency between 200 MHz to 100 GHz. The RF signal may have packets, symbols, or frames corresponding to data for communication. The antenna 128 may be a dipole antenna, a patch antenna, a ring antenna, or any suitable antenna for wireless communication. In one aspect, a single antenna 201 is utilized for both transmitting the RF signal and receiving the RF signal. In one aspect, different antennas 201 are utilized for transmitting the RF signal and receiving the RF signal. In one aspect, multiple antennas 201 are utilized to support multiple-in, multiple-out (MIMO) communication. The antenna 209 may have a configuration similar to that of the antenna 201.

The first wireless interface 202 includes or is embodied as a transceiver for transmitting and receiving RF signals through one or more antennas 201. In some embodiments, the first wireless interface 202 includes or is embodied as a cellular modem or a wireless modem configured to allow the UE 200 to receive wireless Internet access via a mobile broadband connection or a cellular network 220. The cellular network 220 may be 3G, 4G Long Term Evolution (LTE), 5G or 6G. For example, the cellular network may be a packet data network (PDN) in 4G LTE. A mobile Internet user can connect using the wireless modem to a wireless Internet Service Provider (ISP) to get Internet access or IMS services. Referring to FIG. 1, the wireless interface 202 may communicate with a wireless interface 112 of the base station 110 through a wireless communication link 130. In one configuration, the first wireless interface 202 is coupled to one or more antennas 201. In one aspect, the first wireless interface 202 may receive the RF signal at the RF frequency received through antenna 201, and downconvert the RF signal to a baseband frequency (e.g., 0~1 GHz). The first wireless interface 202 may provide the downconverted signal to the processor 204 or the controller 210. In one aspect, the first wireless interface 202 may receive a baseband signal for transmission at a baseband frequency from the processor 124 or the controller 210, and upconvert the baseband signal to generate a RF signal. The first wireless interface 202 may transmit the RF signal through the antenna 201.

The second wireless interface 208 includes or is embodied as a transceiver for transmitting and receiving RF signals through one or more antennas 209. The second wireless interface 208 may be a chipset arranged to communicate over air interface with a WLAN 240 according to a protocol such as IEEE 802.11x. This chipset may then interface with the antenna 209 to facilitate communication with the WLAN. For example, referring to FIG. 1, the second wireless interface 208 may communicate with the wireless interface 152 of the access point 150 (e.g., Wi-Fi interface) through the wireless communication link 140. In one configuration, the second wireless interface 208 is coupled to one or more antennas 209. The second wireless interface 208 may transmit the RF signal through the antenna 209.

The timer 212 may be embodied as hardware, software, firmware, or a combination thereof. For example, the timer 212 may be an electric timer, such as quartz clock or digital counter or watchdog timer. In some embodiments, the timer 212 may be integrated with the processor 204 or implemented as software executed by the processor 204.

The controller 210 may be configured to control at least one of the first wireless interface 202 or the second wireless interface 208. The controller 210 may perform power management of at least one of the first wireless interface 202 or the second wireless interface 208. For example, the controller 210 may turn on/off a wireless interface, activate/disable a wireless interface, or switch/transition a wireless interface between different power modes, for example, an active mode, a minimal receive (RX) mode, a power-save mode, a low power mode. The controller 210 may be configured to detect a status of a communication service, e.g., start and end of an IMS service, by periodically monitoring IMS services (e.g., every 10-15 seconds). The IMS services includes, for example, Voice over LTE (VoLTE), Wi-Fi Calling (VoWIFI), Video over LTE (ViLTE), short message service (SMS)/mertimedia messaging service (MMS) over WiFi and LTE, USSD (Unstructured Supplementary Service Data) over LTE, and Rich Communication Services (RCS). The controller 210 may be configured to set the timer 212 to a particular time, and to start/stop the timer 212.

In some embodiments, the controller 210 may be configured to monitor signal quality of a wireless network (e.g., cellular network 220 or WLAN 240). The controller 210 may configure a wireless interface (e.g., interface 202 or 208) to collect or measure a signal strength of received signals. For example, the signal strength may be at least one of received signal strength indicator (RSSI) in dBm or signal-to-noise ratio (SNR) in dB, SINR (Signal-to-Interference-plus-Noise Ratio), PDR (Packet-Delivery Ratio), and BER (Bit-Error Rate).

In some embodiments, the controller 210 may be configured to control a handover between two wireless networks, for example, cellular network 220 and WLAN 240. The controller 210 may automatically switch the wireless connection of the UE 200 between WLAN and cellular network based on a result of signal quality monitoring. For example, the controller 210 may perform an automatic handover to the WLAN in response to determining that signal quality of WLAN as a result of the monitoring is greater than or equal to a threshold. In some embodiments, the controller 210 may perform an automatic handover to a cellular network in response to determining that signal quality of WLAN as a result of the monitoring is lower than a threshold. In some embodiments, the controller 210 may perform power management based on a handover status between a cellular network and WLAN as described below with reference to FIG. 5 to FIG. 7.

In some embodiments, the controller 210 may be configured to have access to and use a cellular network (e.g., cellular network 220 in FIG. 2). The controller 210 may (1) initially make contact with a base station (e.g., base station 110 in FIG. 1), and can then (2) register with the network. In some embodiments, during the first stage, the controller 210 may use a paging or control channel to send an attach message to a base station (or target cell site) on the cellular network, thereby indicating the presence of the UE 200. In some embodiments, once the attach message has been successfully sent, the controller 210 may perform a registration with the cellular network by (1) communicating with the network the identity of a subscriber to ensure that the subscriber account is valid, and (2) registering the UE with Home Location Register (HLR) and/or Visitors Location Register (VLR) of the cellular network so that the cellular network can keep track of the location/position of the UE. In some embodiments, after the registration, the controller 210 may update the register (HLR and/or VLR) with its position by periodically communicating with the network its position and status.

The above-described functions of the controller 210 may be embodied as hardware, or a combination of hardware and software/firmware. In some embodiments, the controller 210 may be integrated with the processor 204 or implemented as software executed by the processor 204.

The processor 204 is a component that processes data. The processor 204 may be embodied as field programmable gate array (FPGA), application specific integrated circuit (ASIC), a logic circuit, etc. The processor 204 may obtain instructions from the memory device 206, and can execute the instructions. The memory device 206 is a component that stores data. The memory device 206 may be embodied as random access memory (RAM), flash memory, read only memory (ROM), erasable programmable read-only memory (EPROM), electrically erasable programmable read-only memory (EEPROM), registers, a hard disk, a removable disk, a CD-ROM, or any device capable for storing data. The memory device 206 may be embodied as a non-transitory computer readable medium storing instructions executable by the processor 124 to perform various functions of the UE 200 disclosed herein. In some embodiments, the memory device 206 and the processor 204 are integrated as a single component.

Figure 3:
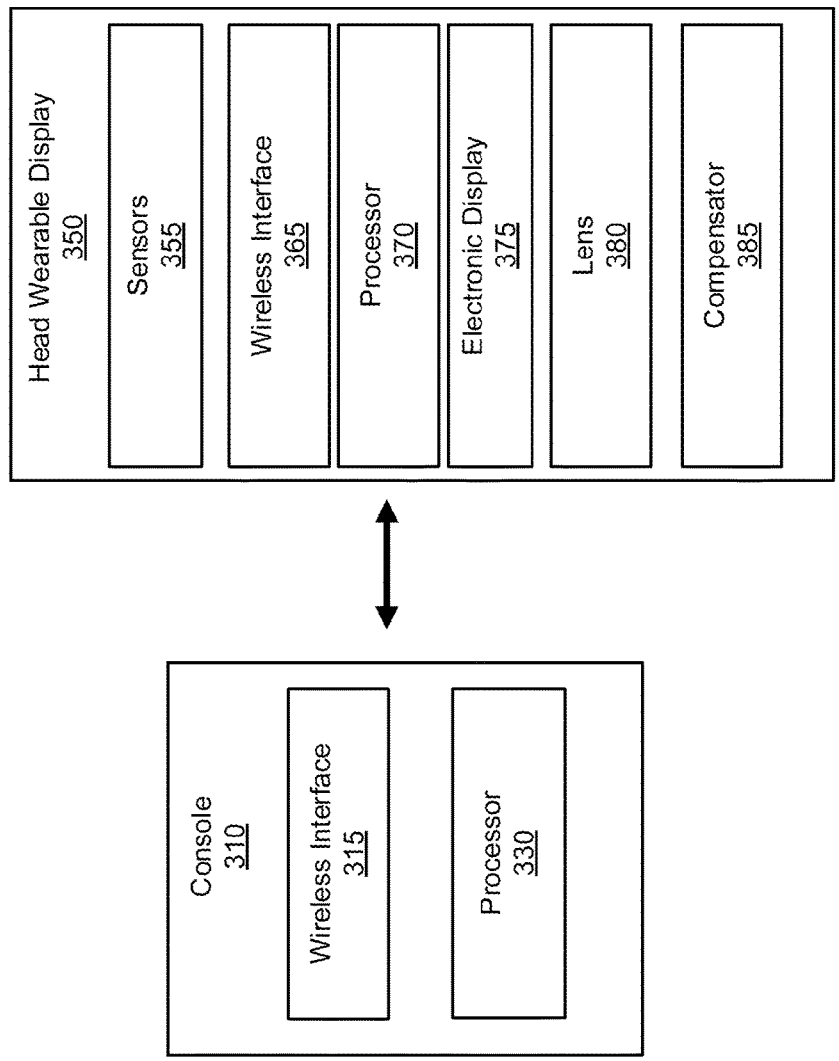
FIG. 3 is a diagram of a console and a head wearable display for presenting augmented reality or virtual reality, according to an example implementation of the present disclosure.

FIG. 3 is a block diagram of an example artificial reality system environment 300. In some embodiments, the artificial reality system environment 300 includes a HWD 350 worn by a user, and a console 310 providing content of artificial reality (e.g., augmented reality, virtual reality, mixed reality) to the HWD 350. Each of the HWD 350 and the console 310 may be a separate UE, for example, UE 120 in FIG. 1 and UE 200 in FIG. 2.

Referring to FIG. 3, the HWD 350 may be referred to as, include, or be part of a head mounted display (HMD), head mounted device (HMD), head wearable device (HWD), head worn display (HWD) or head worn device (HWD). The HWD 350 may detect its location and/or orientation of the HWD 350 as well as a shape, location, and/or an orientation of the body/hand/face of the user, and provide the detected location/or orientation of the HWD 350 and/or tracking information indicating the shape, location, and/or orientation of the body/hand/face to the console 310. The console 310 may generate image data indicating an image of the artificial reality according to the detected location and/or orientation of the HWD 350, the detected shape, location and/or orientation of the body/hand/face of the user, and/or a user input for the artificial reality, and transmit the image data to the HWD 350 for presentation. In some embodiments, the artificial reality system environment 300 includes more, fewer, or different components than shown in FIG. 3. In some embodiments, functionality of one or more components of the artificial reality system environment 300 can be distributed among the components in a different manner than is described here. For example, some of the functionality of the console 310 may be performed by the HWD 350. For example, some of the functionality of the HWD 350 may be performed by the console 310. In some embodiments, the console 310 is integrated as part of the HWD 350.

In some embodiments, the HWD 350 is an electronic component that can be worn by a user and can present or provide an artificial reality experience to the user. The HWD 350 may render one or more images, video, audio, or some combination thereof to provide the artificial reality experience to the user. In some embodiments, audio is presented via an external device (e.g., speakers and/or headphones) that receives audio information from the HWD 350, the console 310, or both, and presents audio based on the audio information. In some embodiments, the HWD 350 includes sensors 355, a wireless interface 365, a processor 370, an electronic display 375, a lens 380, and a compensator 385. These components may operate together to detect a location of the HWD 350 and a gaze direction of the user wearing the HWD 350, and render an image of a view within the artificial reality corresponding to the detected location and/ or orientation of the HWD 350. In other embodiments, the HWD 350 includes more, fewer, or different components than shown in FIG. 3.

In some embodiments, the sensors 355 include electronic components or a combination of electronic components and software components that detect a location and an orientation of the HWD 350. Examples of the sensors 355 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 355 detect the translational movement and the rotational movement, and determine an orientation and location of the HWD 350. In one aspect, the sensors 355 can detect the translational movement and the rotational movement with respect to a previous orientation and location of the HWD 350, and determine a new orientation and/or location of the HWD 350 by accumulating or integrating the detected translational movement and/or the rotational movement. Assuming for an example that the HWD 350 is oriented in a direction 25 degrees from a reference direction, in response to detecting that the HWD 350 has rotated 20 degrees, the sensors 355 may determine that the HWD 350 now faces or is oriented in a direction 45 degrees from the reference direction. Assuming for another example that the HWD 350 was located two feet away from a reference point in a first direction, in response to detecting that the HWD 350 has moved three feet in a second direction, the sensors 355 may determine that the HWD 350 is now located at a vector multiplication of the two feet in the first direction and the three feet in the second direction.

In some embodiments, the sensors 355 include eye trackers. The eye trackers may include electronic components or a combination of electronic components and software components that determine a gaze direction of the user of the HWD 350. In some embodiments, the HWD 350, the console 310 or a combination of them may incorporate the gaze direction of the user of the HWD 350 to generate image data for artificial reality. In some embodiments, the eye trackers include two eye trackers, where each eye tracker captures an image of a corresponding eye and determines a gaze direction of the eye. In one example, the eye tracker determines an angular rotation of the eye, a translation of the eye, a change in the torsion of the eye, and/or a change in shape of the eye, according to the captured image of the eye, and determines the relative gaze direction with respect to the HWD 350, according to the determined angular rotation, translation and the change in the torsion of the eye. In one approach, the eye tracker may shine or project a predetermined reference or structured pattern on a portion of the eye, and capture an image of the eye to analyze the pattern projected on the portion of the eye to determine a relative gaze direction of the eye with respect to the HWD 350. In some embodiments, the eye trackers incorporate the orientation of the HWD 350 and the relative gaze direction with respect to the HWD 350 to determine a gate direction of the user. Assuming for an example that the HWD 350 is oriented at a direction 30 degrees from a reference direction, and the relative gaze direction of the HWD 350 is −10 degrees (or 350 degrees) with respect to the HWD 350, the eye trackers may determine that the gaze direction of the user is 20 degrees from the reference direction. In some embodiments, a user of the HWD 350 can configure the HWD 350 (e.g., via user settings) to enable or disable the eye trackers. In some embodiments, a user of the HWD 350 is prompted to enable or disable the eye trackers.

In some embodiments, the wireless interface 365 includes an electronic component or a combination of an electronic component and a software component that communicates with the console 310. In some embodiments, the wireless interface 365 may be or correspond to a combination of the first wireless interface 202 (e.g., cellular modem) and/or the second wireless interface 208 (e.g., Wi-Fi inter interface) in FIG. 2. The wireless interface 365 may communicate with a wireless interface 315 of the console 310 through a wireless communication link through the base station 110. Through the communication link, the wireless interface 365 may transmit to the console 310 data indicating the determined location and/or orientation of the HWD 350, and/or the determined gaze direction of the user. Moreover, through the communication link, the wireless interface 365 may receive from the console 310 image data indicating or corresponding to an image to be rendered and additional data associated with the image.

In some embodiments, the processor 370 includes an electronic component or a combination of an electronic component and a software component that generates one or more images for display, for example, according to a change in view of the space of the artificial reality. In some embodiments, the processor 370 is implemented as a part of the processor 204 (see FIG. 2) or is communicatively coupled to the processor 204. In some embodiments, the processor 370 is implemented as a processor (or a graphical processing unit (GPU)) that executes instructions to perform various functions described herein. The processor 370 may receive, through the wireless interface 365, image data describing an image of artificial reality to be rendered and additional data associated with the image, and render the image to display through the electronic display 375. In some embodiments, the image data from the console 310 may be encoded, and the processor 370 may decode the image data to render the image. In some embodiments, the processor 370 receives, from the console 310 in additional data, object information indicating virtual objects in the artificial reality space and depth information indicating depth (or distances from the HWD 350) of the virtual objects. In one aspect, according to the image of the artificial reality, object information, depth information from the console 310, and/or updated sensor measurements from the sensors 355, the processor 370 may perform shading, reprojection, and/or blending to update the image of the artificial reality to correspond to the updated location and/or orientation of the HWD 350. Assuming that a user rotated his head after the initial sensor measurements, rather than recreating the entire image responsive to the updated sensor measurements, the processor 370 may generate a small portion (e.g., 10%) of an image corresponding to an updated view within the artificial reality according to the updated sensor measurements, and append the portion to the image in the image data from the console 310 through reprojection. The processor 370 may perform shading and/or blending on the appended edges. Hence, without recreating the image of the artificial reality according to the updated sensor measurements, the processor 370 can generate the image of the artificial reality.

In some embodiments, the electronic display 375 is an electronic component that displays an image. The electronic display 375 may, for example, be a liquid crystal display or an organic light emitting diode display. The electronic display 375 may be a transparent display that allows the user to see through. In some embodiments, when the HWD 350 is worn by a user, the electronic display 375 is located proximate (e.g., less than 3 inches) to the user's eyes. In one aspect, the electronic display 375 emits or projects light towards the user's eyes according to image generated by the processor 370.

In some embodiments, the lens 380 is a mechanical component that alters received light from the electronic display 375. The lens 380 may magnify the light from the electronic display 375, and correct for optical error associated with the light. The lens 380 may be a Fresnel lens, a convex lens, a concave lens, a filter, or any suitable optical component that alters the light from the electronic display 375. Through the lens 380, light from the electronic display 375 can reach the pupils, such that the user can see the image displayed by the electronic display 375, despite the close proximity of the electronic display 375 to the eyes.

In some embodiments, the compensator 385 includes an electronic component or a combination of an electronic component and a software component that performs compensation to compensate for any distortions or aberrations. In one aspect, the lens 380 introduces optical aberrations such as a chromatic aberration, a pin-cushion distortion, barrel distortion, etc. The compensator 385 may determine a compensation (e.g., predistortion) to apply to the image to be rendered from the processor 370 to compensate for the distortions caused by the lens 380, and apply the determined compensation to the image from the processor 370. The compensator 385 may provide the predistorted image to the electronic display 375.

In some embodiments, the console 310 is an electronic component or a combination of an electronic component and a software component that provides content to be rendered to the HWD 350. In one aspect, the console 310 includes a wireless interface 315 and a processor 330. These components may operate together to determine a view (e.g., a FOV of the user) of the artificial reality corresponding to the location of the HWD 350 and the gaze direction of the user of the HWD 350, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location and an orientation of the HWD 350 in a physical space into a virtual space (or simultaneous localization and mapping (SLAM) data), eye tracking data, motion vector information, depth information, edge information, object information, etc. The console 310 may provide the image data and the additional data to the HWD 350 for presentation of the artificial reality. In other embodiments, the console 310 includes more, fewer, or different components than shown in FIG. 3. In some embodiments, the console 310 is integrated as part of the HWD 350.

In some embodiments, the wireless interface 315 is an electronic component or a combination of an electronic component and a software component that communicates with the HWD 350. In some embodiments, the wireless interface 315 may be or correspond to a combination of the first wireless interface 202 (e.g., cellular modem) and/or the second wireless interface 208 (e.g., Wi-Fi inter interface) in FIG. 2. The wireless interface 315 may be a counterpart component to the wireless interface 365 to communicate through a communication link (e.g., wireless communication link). Through the communication link, the wireless interface 315 may receive from the HWD 350 data indicating the determined location and/or orientation of the HWD 350, and/or the determined gaze direction of the user. Moreover, through the communication link, the wireless interface 315 may transmit to the HWD 350 image data describing an image to be rendered and additional data associated with the image of the artificial reality.

The processor 330 can include or correspond to a component that generates content to be rendered according to the location and/or orientation of the HWD 350. In some embodiments, the processor 330 is implemented as a part of the processor 204 (see FIG. 2) or is communicatively coupled to the processor 204. In some embodiments, the processor 330 may incorporate the gaze direction of the user of the HWD 350. In one aspect, the processor 330 determines a view of the artificial reality according to the location and/or orientation of the HWD 350. For example, the processor 330 maps the location of the HWD 350 in a physical space to a location within an artificial reality space, and determines a view of the artificial reality space along a direction corresponding to the mapped orientation from the mapped location in the artificial reality space. The processor 330 may generate image data describing an image of the determined view of the artificial reality space, and transmit the image data to the HWD 350 through the wireless interface 315. In some embodiments, the processor 330 may generate additional data including motion vector information, depth information, edge information, object information, hand model data, etc., associated with the image, and transmit the additional data together with the image data to the HWD 350 through the wireless interface 315. The processor 330 may encode the image data describing the image, and can transmit the encoded data to the HWD 350. In some embodiments, the processor 330 generates and provides the image data to the HWD 350 periodically (e.g., every 11 ms).

In one aspect, the process of detecting the location of the HWD 350 and the gaze direction of the user wearing the HWD 350, and rendering the image to the user should be performed within a frame time (e.g., 11 ms or 16 ms). A latency between a movement of the user wearing the HWD 350 and an image displayed corresponding to the user movement can cause judder, which may result in motion sickness and can degrade the user experience. In one aspect, the HWD 350 and the console 310 can prioritize communication for augmented reality or virtual reality, such that the latency between the movement of the user wearing the HWD 350 and the image displayed corresponding to the user movement can be presented within the frame time (e.g., 11 ms or 16 ms) to provide a seamless experience.

Figure 4:
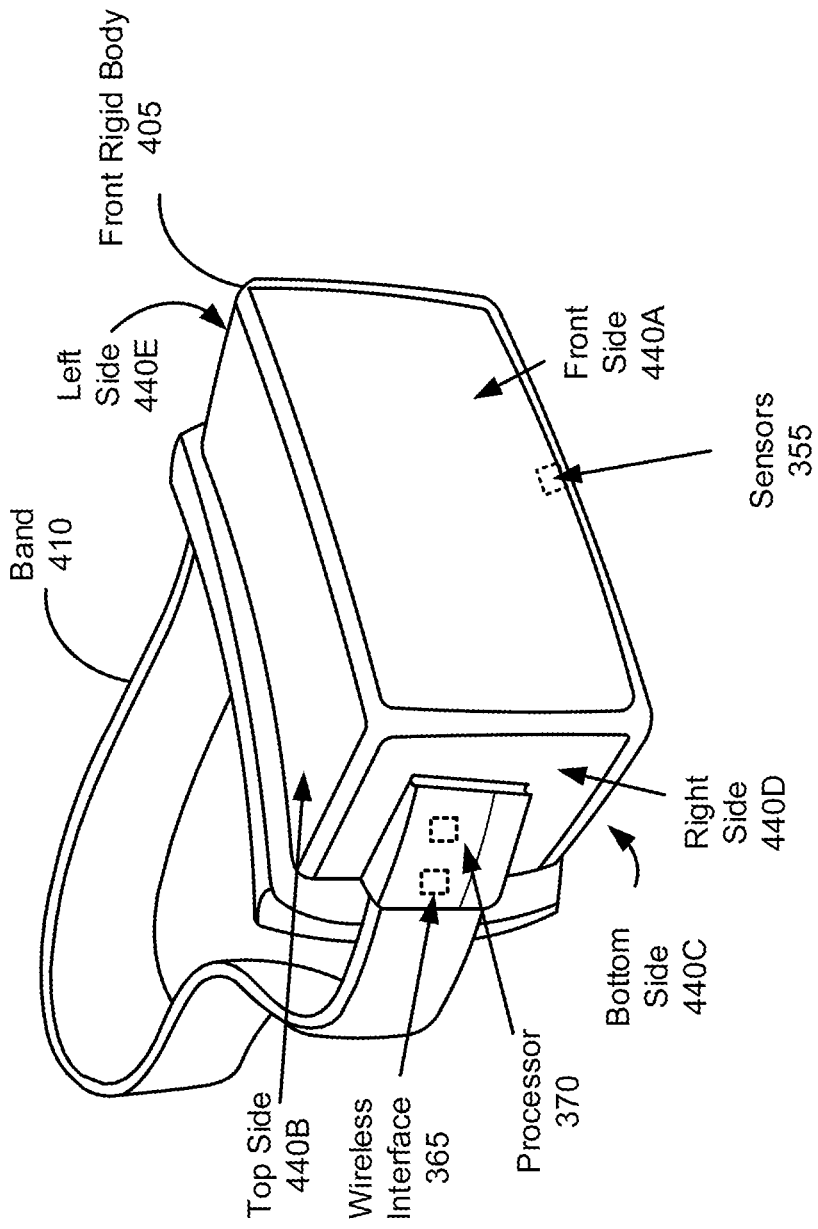
FIG. 4 is a diagram of a head wearable display, according to an example implementation of the present disclosure.

FIG. 4 is a diagram of a HWD 350, in accordance with an example embodiment. In some embodiments, the HWD 350 includes a front rigid body 405 and a band 410. The front rigid body 405 includes the electronic display 375 (not shown in FIG. 3), the lens 380 (not shown in FIG. 4), the sensors 355, the wireless interface 365, and the processor 370. In the embodiment shown by FIG. 4, the wireless interface 365, the processor 370, and the sensors 355 are located within the front rigid body 405, and may not be visible externally. In other embodiments, the HWD 350 has a different configuration than shown in FIG. 4. For example, the wireless interface 365, the processor 370, and/or the sensors 355 may be in different locations than shown in FIG. 4.

Figure 5:
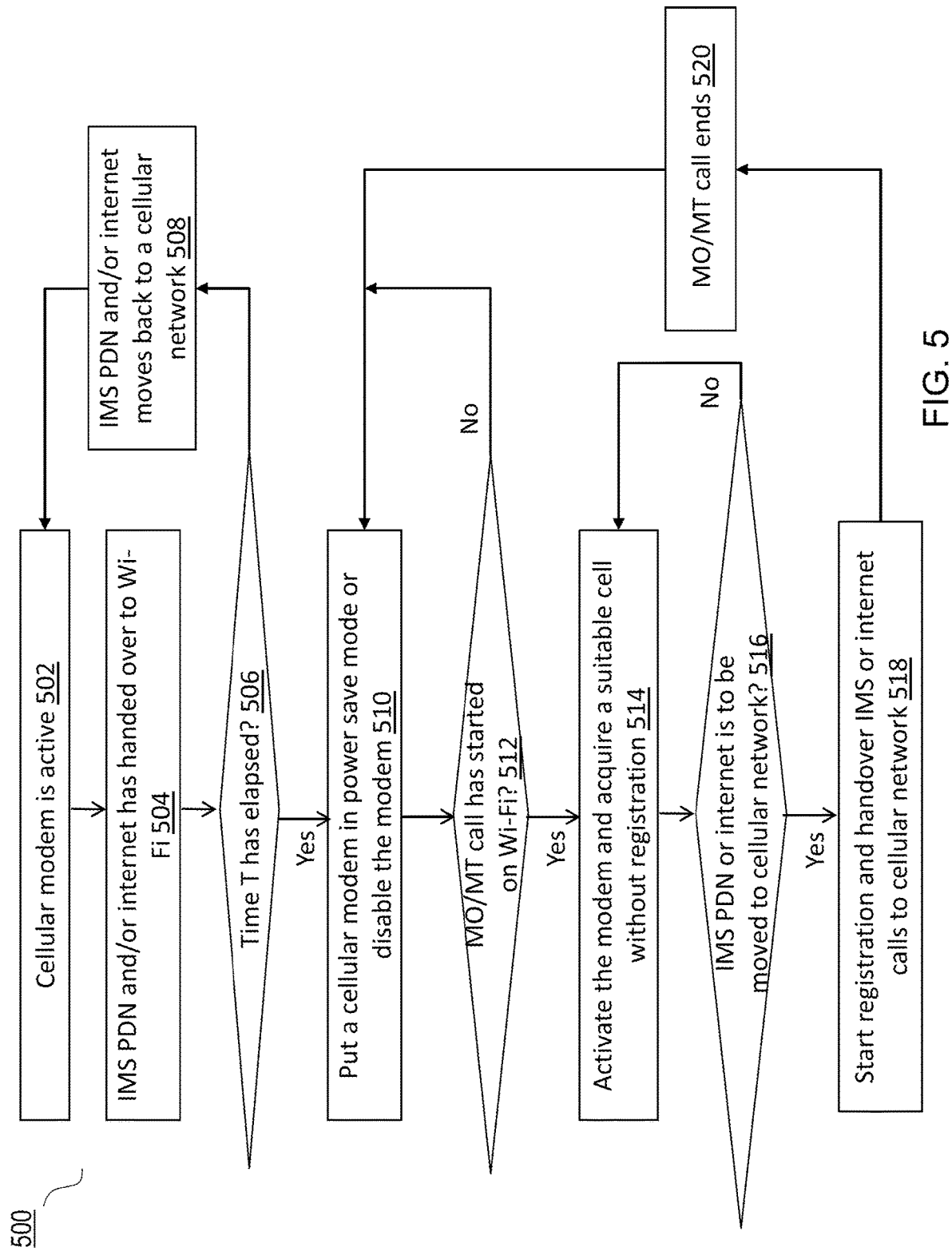
FIG. 5 is a flowchart showing a process of performing power management based on a handover status of a service between two wireless networks, according to an example implementation of the present disclosure.

FIG. 5 is a flowchart showing a process 500 of performing power management based on a handover status of a service between two wireless networks, according to an example implementation of the present disclosure. In some embodiments, the process 500 is performed by a UE (e.g., UE 200 or UE 120 or HWD 350 or console 310) including a controller (e.g., controller 210), a cellular modem (e.g., wireless interface 202), and/or a timer (e.g., timer 212). In some embodiments, the process 500 is performed by other entities. In some embodiments, the process 500 includes more, fewer, or different steps than shown in FIG. 5.

In one approach, the controller (e.g., controller 210) may determine 502 that (1) the cellular modem (e.g., wireless interface 202) of the UE (e.g., UE 200) is active. In one approach, the controller may determine 504 that (2) IMS PDN and/or internet have been handed over from a cellular network (e.g., cellular network 220) to WLAN (e.g., WLAN 240). In response to the determining the conditions (1) and (2), the controller may start 506 a timer (e.g., timer 212) that is set to time T. In one approach, time T may be a time to ensure that Wi-Fi signal quality should be sufficient (e.g., continuously over time T, or by the end of time T) to handle a service (e.g., IMS service). An example value of time T is in a range from 10 seconds to 15 seconds.

In one approach, the controller may determine 506 whether time T has elapsed. If the Wi-Fi signal quality is not sufficient to handle the service (e.g., the signal quality is lower than a threshold), the controller may hand over 508 the IMS PDN and/or internet back to the cellular network within time T. In some embodiments, the signal quality may be, or is measured based on, at least one of received signal strength indicator (RSSI) in dBm or signal-to-noise ratio (SNR) in dB, SINR (Signal-to-Interference-plus-Noise Ratio), PDR (Packet-Delivery Ratio), or BER (Bit-Error Rate).

In one approach, after the timer expires ("Yes" in step 506), e.g., time T has elapsed, the controller may put (or switch or keep) 510 the cellular modem of the UE in a power-save mode. In some embodiments, after time T has elapsed, the controller may disable the cellular modem.

In one approach, the controller may determine or detect 512 that a MO/MT call has started on WLAN (e.g., using WLAN interface 208). In one approach, in response to determining that the MO/MT call has started on WLAN ("Yes" in step 512), the controller may activate 514 the modem and can acquire a suitable cell (or target cell site or target base station; e.g., base station 110) without registration. For example, the controller may use a paging or control channel to send an attach message to the target base station on the cellular network, thereby indicating the presence of the UE. In response to determining that the MO/MT call has not started on WLAN ("No" in step 512), the controller may maintain 516 the cellular modem in a power-save mode.

In one approach, the controller may determine 516 whether IMS PDN or internet is to be handed over to the cellular network. In some embodiments, the controller may determine whether the MO/MT call has ended, and in response to determining that the call has not ended, can determine that the IMS PDN or internet is to be handed over to the cellular network. On the other hand, in response to determining that the call has ended, the controller may determine that the IMS PDN or internet is not to be handed over to the cellular network ("No" in step 516), and can maintain a pre-registration state (e.g., maintaining the state of step 514).

In one approach, in response to determining that the IMS PDN or internet is to be handed over to the cellular network ("Yes" in step 516), the controller may start 518 registration and can perform handover of the IMS PDN or internet to the cellular network. In some embodiments, the controller may perform registration by (1) communicating with the cellular network the identity of a subscriber to ensure that the subscriber account is valid, and (2) registering the UE with HLR and/or VLR of the cellular network so that the cellular network can keep track of the location/position of the UE.

In one approach, the controller may determine 520 that the MO/MT call has ended. In response to determining that the MO/MT call has ended, the controller may put (or switch or keep) 510 the cellular modem of the UE in a power-save mode or disable the modem.

Figure 6:
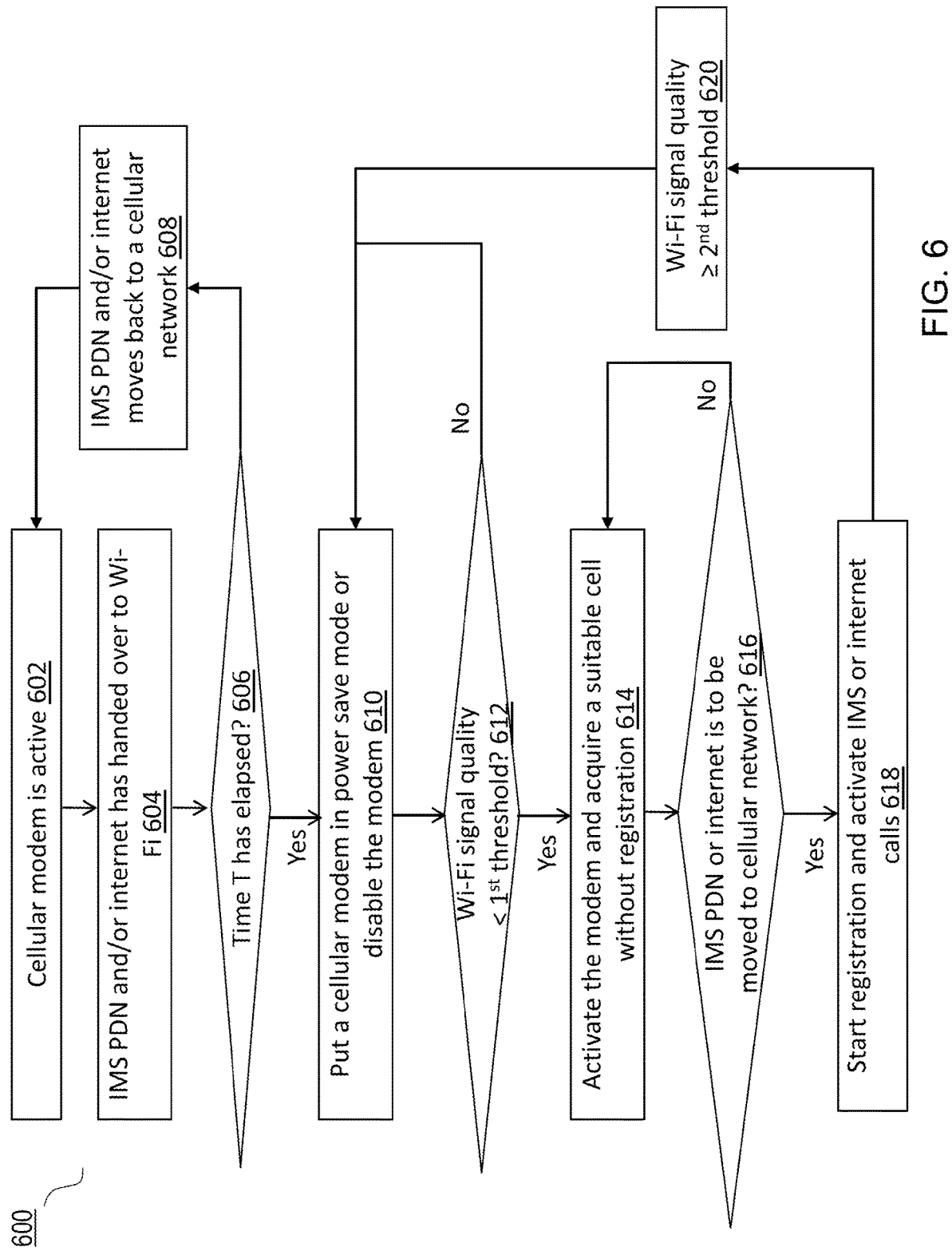
FIG. 6 is a flowchart showing a process of performing power management based on a handover status of a service between two wireless networks, according to an example implementation of the present disclosure.

FIG. 6 is a flowchart showing a process 600 of performing power management based on a handover status of a service between two wireless networks, according to an example implementation of the present disclosure. In some embodiments, the process 600 is performed by a UE (e.g., UE 200 or UE 120 or HWD 350 or console 310) including a controller (e.g., controller 210), a cellular modem (e.g., wireless interface 202), and/or a timer (e.g., timer 212). In some embodiments, the process 600 is performed by other entities. In some embodiments, the process 600 includes more, fewer, or different steps than shown in FIG. 6.

In one approach, the controller (e.g., controller 210) may determine 602 that (1) a cellular modem (e.g., wireless interface 202) of the UE (e.g., UE 200) is active. In one approach, the controller may determine 604 that (2) IMS PDN and/or internet have been handed over from a cellular network (e.g., cellular network 220) to WLAN (e.g., WLAN 240). In response to the determining the conditions (1) and (2), the controller may start 606 a timer (e.g., timer 212) that is set to time T. In one approach, time T may be a time to ensure that Wi-Fi signal quality (e.g., over the time T, or by the time T) should be sufficient to handle a service (e.g., IMS service). An example value of time T is in a range from 10 seconds to 15 seconds.

In one approach, the controller may determine 606 whether time T has elapsed. If the Wi-Fi signal quality is not sufficient to handle the service (e.g., the signal quality is lower than a threshold), the controller may hand over 608 the IMS PDN and/or internet back to the cellular network within time T. In some embodiments, the signal quality may be, or measured based on, at least one of at least one of received signal strength indicator (RSSI) in dBm or signal-to-noise ratio (SNR) in dB, SINR (Signal-to-Interference-plus-Noise Ratio), PDR (Packet-Delivery Ratio), and BER (Bit-Error Rate).

In one approach, after the timer expires ("Yes" in step 606), e.g., time T has elapsed, the controller may put (or switch or keep) 610 the cellular modem of the UE in a power-save mode. In some embodiments, after time T has elapsed, the controller may disable the cellular modem.

In one approach, the controller may determine or detect 612 that Wi-Fi signal quality is lower than a first threshold (by monitoring wireless signals using the wireless interface 202). In one approach, in response to determining that the Wi-Fi signal quality is lower than the first threshold ("Yes" in step 612), the controller may activate 614 the modem and can acquire a suitable cell (or target cell site or target base station; e.g., base station 110) without registration. For example, the controller may use a paging or control channel to send an attach message to the target base station on the cellular network, thereby indicating the presence of the UE. In response to determining that the Wi-Fi signal quality is greater than or equal to the first threshold ("No" in step 612), the controller may maintain 616 the cellular modem in a power-save mode.

In one approach, the controller may determine 616 whether IMS PDN or internet is to be handed over to the cellular network. In some embodiments, the controller may determine whether Wi-Fi signal quality is lower than a second threshold, and in response to determining that the Wi-Fi signal quality is lower than the second threshold, can determine that the IMS PDN or internet is to be handed over to the cellular network. In some embodiments, the second threshold may be lower than the first threshold. On the other hand, in response to determining that the Wi-Fi signal quality is greater than or equal to the second threshold, the controller may determine that the IMS PDN or internet is not to be handed over to the cellular network ("No" in step 616), and can maintain a pre-registration state (e.g., maintaining the state of step 614).

In one approach, in response to determining that the IMS PDN or internet is to be handed over to the cellular network ("Yes" in step 616), the controller may start 618 registration and perform handover of the IMS PDN or internet to the cellular network. In some embodiments, the controller may perform registration by (1) communicating with the cellular network the identity of a subscriber to ensure that the subscriber account is valid, and (2) registering the UE with HLR and/or VLR of the cellular network so that the cellular network can keep track of the location/position of the UE.

In one approach, the controller may determine 620 that Wi-Fi signal quality is greater than or equal to the second threshold. In response to determining that the Wi-Fi signal quality is greater than or equal to the second threshold, the controller may put (or switch or keep) 610 the cellular modem of the UE in a power-save mode or disable the modem.

Figure 7:
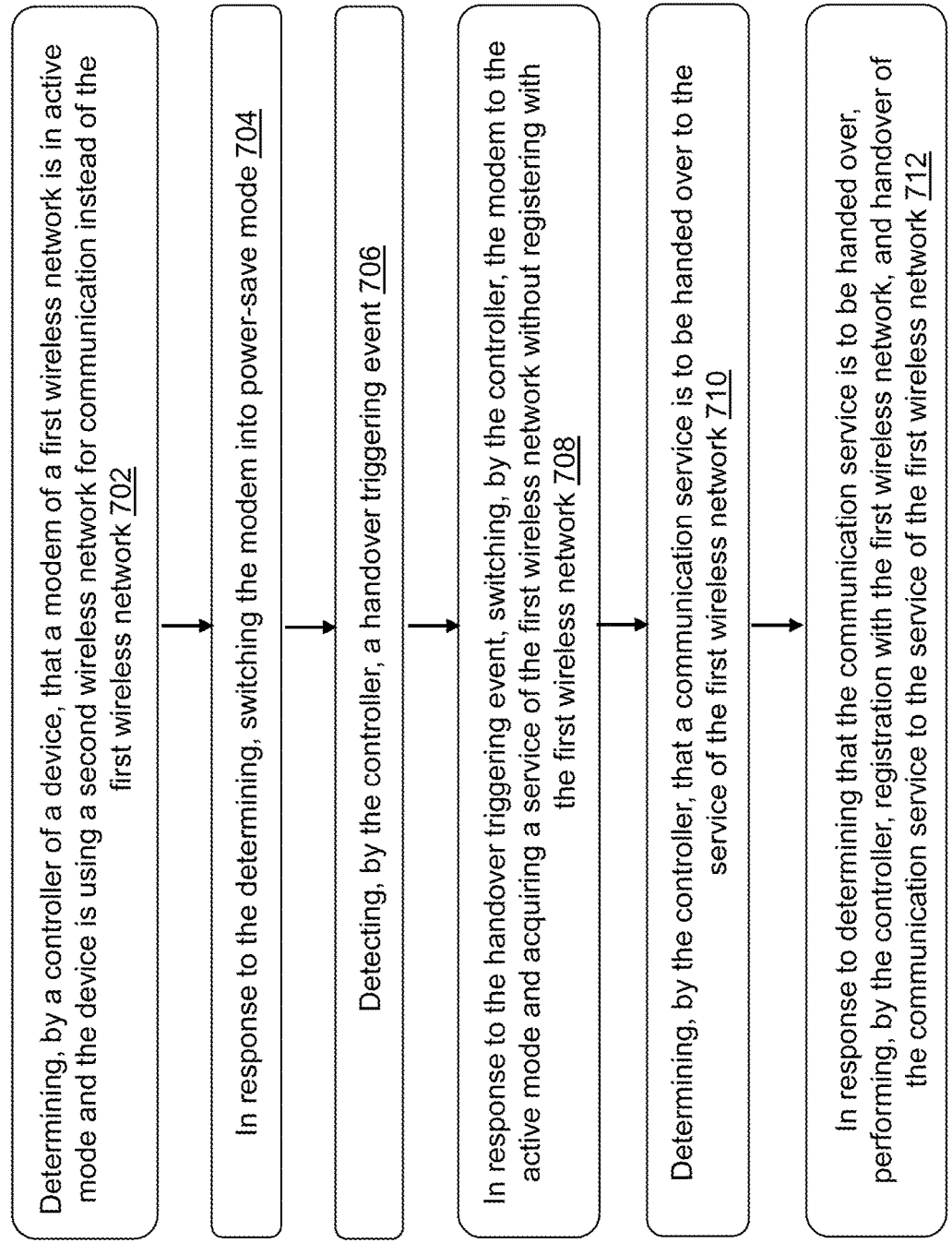
FIG. 7 is a flowchart showing a process of performing power management based on a handover status of a service between two wireless networks, according to an example implementation of the present disclosure.

FIG. 7 is a flowchart showing a process 700 of performing power management based on a handover status of a service between two wireless networks, according to an example implementation of the present disclosure. In some embodiments, the process 700 is performed by a wireless device (e.g., UE 200 or UE 120 or HWD 350 or console 310) including a controller (e.g., controller 210), and/or a cellular modem of a first wireless network (e.g., wireless interface 202 of the cellular network 220). In some embodiments, the process 700 is performed by other entities. In some embodiments, the process 700 includes more, fewer, or different steps than shown in FIG. 7.

In one approach, the controller (e.g., controller 210) may determine 702 that the modem (e.g., first wireless interface 202) is in active mode and the device is using a second wireless network (e.g., WLAN 240) for communication instead of the first wireless network (e.g., cellular network 220). In some embodiments, the modem may be a cellular modem. The first wireless network may be a cellular network. The second wireless network may be a wireless local area network (WLAN).

In one approach, in response to the determining in 702, the controller may switch/transition 704 the modem into a power-save mode. In some embodiments, the device may include a timer (e.g., timer 212). In response to determining that that the modem is in active mode and the device is using a second wireless network for communication instead of the first wireless network, the controller may be configured to start the timer which is set to a predetermined time. The predetermined time may be a time to ensure that Wi-Fi signal quality is good enough (e.g., during that time), for example, 10-15 seconds. After the predetermined time elapses, the controller may be configured to switch the modem into the power-save mode. In some embodiments, after the predetermined time elapses, the controller may disable the modem. In some embodiments, in response to determining that a signal strength of a signal in the second wireless network is greater than or equal to a first threshold for using the second wireless network, the controller may be configured to switch the modem of the first wireless network to the power-save mode.

In one approach, the controller may detect 706 a handover triggering event. In some embodiments, the handover triggering event is a start/initialization/triggering of one or more communication services. The one or more communication services may include at least one of a MO voice service, a MO video service, a MO short message service (SMS), a MT voice service, a MT video service, or a MT SMS. In some embodiments, the handover triggering event may be/include a degradation of a quality of signals of the second wireless network. In some embodiments, the device may determine a degradation of a quality of signals of WLAN by (1) monitoring Wi-Fi signals on a WLAN interface (e.g., second wireless interface 208), (2) obtaining or measuring a signal quality of a Wi-Fi signal (e.g., RSSI, SNR, SINR, PDR, or BER), (3) comparing the signal quality with a threshold, and/or (4) determining the degradation of the quality of WLAN signals if the signal quality is lower than the threshold.

In one approach, in response to the handover triggering event (e.g., an IMS service has started or a signal degradation occurs), the controller may switch 708 the modem to the active mode and can acquire a service of the first wireless network (e.g., acquire a suitable base station) without registering with the first wireless network. For example, the controller may use a paging or control channel to send an attach message to the target base station on the cellular network, thereby indicating the presence of the device.

In one approach, the controller may determine 710 that a communication service is to be handed over to the service of the first wireless network. In some embodiments, the communication service is an internet protocol (IP) multimedia subsystem (IMS) service. In some embodiments, in determining that the communication service is to be handed over to the service of the first wireless network, the controller may be configured to determine that the communication service has not ended (e.g., a MO/MT call has started and is ongoing) and/or that a signal strength of a signal in the second wireless network is smaller than a second threshold for using the second wireless network. For example, the second threshold may be lower than the first threshold.

In one approach, in response to determining that the communication service is to be handed over, the controller may perform 712 registration with the first wireless network, and can perform handover of the communication service to the service of the first wireless network. For example, the controller may perform registration by (1) communicating with the cellular network the identity of a subscriber to ensure that the subscriber account is valid, and (2) registering the device with HLR and/or VLR of the cellular network so that the cellular network can keep track of the location/position of the device.

In some embodiments, the controller may be configured to determine that the one or more communication services (e.g., the MO/MT call) have ended. In response to determining that the one or more communication services have ended, the controller may be configured to switch the modem into the power-save mode.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A device, comprising:
   a modem of a first wireless network; and
   a controller configured to:
      determine that the modem is in active mode and the device is using a second wireless network for communication instead of the first wireless network,
      in response to the determining, switch the modem into power-save mode,
      detect a handover triggering event,
      in response to the handover triggering event, switch the modem to the active mode and acquire a service of the first wireless network without registering with the first wireless network,
      determine that a communication service is to be handed over to the service of the first wireless network;
      in response to determining that the communication service is to be handed over, perform registration with the first wireless network, and perform handover of the communication service to the service of the first wireless network.

2. The device according to claim 1, further comprising a timer, wherein the controller is configured to:
   in response to determining that that the modem is in active mode and the device is using a second wireless network for communication instead of the first wireless network, start the timer which is set to a predetermined time; and after the predetermined time elapses, switch the modem into the power-save mode.

3. The device according to claim 1, wherein
the modem is a cellular modem,
the first wireless network is a cellular network, and
the second wireless network is a wireless local area network (WLAN).

4. The device according to claim 1, wherein the communication service is an internet protocol (IP) multimedia subsystem (IMS) service.

5. The device according to claim 1, wherein the handover triggering event is a start of one or more communication services.

6. The device according to claim 5, wherein the one or more communication services comprise at least one of a mobile originating (MO) voice service, a MO video service, a MO short message service (SMS), a mobile terminating (MT) voice service, a MT video service, or a MT SMS.

7. The device according to claim 5, wherein the controller is configured to:
determine that the one or more communication services have ended; and
in response to determining that the one or more communication services have ended, switch the modem into the power-save mode.

8. The device according to claim 1, wherein the handover triggering event is a degradation of a quality of signals of the second wireless network.

9. The device according to claim 8, wherein the controller is configured to:
in response to determining that a signal strength of a signal in the second wireless network is greater than or equal to a first threshold for using the second wireless network, switch the modem of the first wireless network to the power-save mode.

10. The device according to claim 1, wherein in determining that the communication service is to be handed over to the service of the first wireless network, the controller is configured to:
determine that the communication service has not ended; and
determine that a signal strength of a signal in the second wireless network is smaller than a second threshold for using the second wireless network.

11. A method comprising:
determining, by a controller of a device, that a modem of a first wireless network is in active mode and the device is using a second wireless network for communication instead of the first wireless network,
in response to the determining, switching the modem into power-save mode,
detecting, by the controller, a handover triggering event,
in response to the handover triggering event, switching, by the controller, the modem to the active mode and acquiring a service of the first wireless network without registering with the first wireless network,
determining, by the controller, that a communication service is to be handed over to the service of the first wireless network;
in response to determining that the communication service is to be handed over, performing, by the controller, registration with the first wireless network, and handover of the communication service to the service of the first wireless network.

12. The method according to claim 11, further comprising:
in response to determining that that the modem is in active mode and the device is using a second wireless network for communication instead of the first wireless network, starting a timer which is set to a predetermined time; and
after the predetermined time elapses, switching the modem into the power-save mode.

13. The method according to claim 11, wherein
the modem is a cellular modem,
the first wireless network is a cellular network, and
the second wireless network is a wireless local area network (WLAN).

14. The method according to claim 11, wherein the communication service is an internet protocol (IP) multimedia subsystem (IMS) service.

15. The method according to claim 11, wherein the handover triggering event is a start of one or more communication services.

16. The method according to claim 15, wherein the one or more communication services comprise at least one of a mobile originating (MO) voice service, a MO video service, a MO short message service (SMS), a mobile terminating (MT) voice service, a MT video service, or a MT SMS.

17. The method according to claim 15, further comprising:
determining that the one or more communication services have ended; and
in response to determining that the one or more communication services have ended, switching the modem into the power-save mode.

18. The method according to claim 11, wherein the handover triggering event is a degradation of a quality of signals of the second wireless network.

19. The method according to claim 18, further comprising:
in response to determining that a signal strength of a signal in the second wireless network is greater than or equal to a first threshold for using the second wireless network, switching the modem of the first wireless network to the power-save mode.

20. The method according to claim 11, wherein determining that the communication service is to be handed over to the service of the first wireless network, comprises:
determining that the communication service has not ended; and
determining that a signal strength of a signal in the second wireless network is smaller than a second threshold for using the second wireless network.

\* \* \* \* \*